United States Patent [19]
Flux et al.

[11] Patent Number: 5,145,321
[45] Date of Patent: Sep. 8, 1992

[54] HELICOPTER ROTORS WITH ELASTOMERIC BEARINGS

[75] Inventors: Peter J. Flux; Gerald H. Martyn, both of Yeovil, England

[73] Assignee: Westland Helicopters Limited, England

[21] Appl. No.: 672,630

[22] Filed: Mar. 20, 1991

[30] Foreign Application Priority Data
Mar. 24, 1990 [GB] United Kingdom ............... 9006668

[51] Int. Cl.⁵ .............................................. B64C 27/14
[52] U.S. Cl. ............................ 416/244 R; 416/134 A; 416/141
[58] Field of Search .......... 416/134 A, 140 A, 141 R, 416/244 R, 244 C, 244 D; 244/17.11, 17.27

[56] References Cited
U.S. PATENT DOCUMENTS

| | | | |
|---|---|---|---|
| 4,115,031 | 9/1978 | Drees et al. | 244/17.27 |
| 4,306,836 | 12/1981 | Mayerjak | 416/244 D |
| 4,877,375 | 10/1989 | Desjardins | 416/134 A |

Primary Examiner—Edward K. Look
Assistant Examiner—Christopher M. Verdier
Attorney, Agent, or Firm—Larson & Taylor

[57] ABSTRACT

A rotor for rotation about an axis includes a driving member rotationally fixed to a drive shaft and having a plurality of equi-spaced drive pins extending radially of the axis of rotation and in a plane of rotation perpendicular to the axis, and located in an elastomeric bearing assembly attached to a gimbal housing connected to a spherical elastomeric thrust bearing having a geometral center located at an intersection of the axis of rotation and the plane of rotation whereby in operation the rotor can be tilted in any direction about the center.

12 Claims, 8 Drawing Sheets

HELICOPTER ROTORS WITH ELASTOMERIC BEARINGS

BACKGROUND OF THE INVENTION

1. Field of the Invention

This invention relates to rotors and is particularly concerned with roots having an axis of rotation and a plurality of radially extending rotor blades rotating in a plane of rotation which can be tilted in any direction relative the axis of rotation. Such rotors are sometimes known as gimbal rotors and can be used in conventional helicopters as either a main sustaining rotor or an anti-torque rotor, and as the sustaining rotor/propeller in tilt wing or tile rotor VTOL aircraft.

2. Description of the Prior Art

EP-A-0221372 describes a constant velocity joint suitable for use in such rotors and comprising six elastomeric bearing assemblies located concentrically around an axis of rotation and with their axes parallel to the axis of rotation. Each elastomeric bearing assembly comprises concentrically arranged cylindrical and spherical elastomeric bearing portions and this may cause difficulty in obtaining optimum properties in all planes of operation and may require large bearings that may be impractical in an operational configuration.

U.S. Pat. No. 4,804,352 describes a link type coupling which can be used for connecting a drive shaft to a rotor hub in an aircraft and having a plurality of links arranged tangentially' with respect to driving and driven members and connected thereto by spherical elastomeric bearings at each end. Each link is attached to the driving member through a stub shaft extending generally tangentially of the driving member. In such an arrangement, all of the highly complex movements necessary to permit tilting of the rotor head in any direction relative the axis of rotation must be accommodated in the individual spherical bearings which must also accommodate all of the torque loads.

The present invention aims to overcome the problems of the prior art arrangements.

SUMMARY OF THE INVENTION

Accordingly, in one aspect this invention provides a rotor having a rotor head supporting a plurality of radially extending rotor blades for rotation about an axis and comprising a driving member rotationally fixed adjacent one end of a drive shaft and having a plurality of equi-spaced drive pins, wherein said driving member has least three drive pins extending radially of the axis of rotation and in a plane of rotation perpendicular to the axis, each drive pin locating in an elastomeric bearing assembly having a spherical elastomeric bearing centered on the drive pin and an elastomeric shear bearing located in the plane of rotation and oriented parallel to the axis of rotation, a gimbal housing attached to the elastomeric shear bearings and supporting a rotor yoke for attachment of the rotor blades, a sperical elastomeric thrust bearing attached to the gimbal housing with its geometral centre located at an intersection of the axis of rotation and the plane of rotation of the driving member whereby in operation the rotor can be tilted in any direction about the centre.

The driving member may have an odd number of drive pins and in one embodiment the driving member may have three drive pins. In such embodiments the drive shaft may be located concentrically within a tubular rotor drive shaft and an inner end of the drive shaft may be attached internally of the rotor drive shaft by flexible coupling means capable of transmitting torque whilst permitting relative axial movements. The flexible coupling means may comprise mated axial splines and in such an embodiment the spherical elastomeric thrust bearing may be attached to the end of the rotor drive shaft.

Alternatively the driving member may have an even number of drive pins and in one embodiment the driving member may have six drive pins. In such embodiments the driving member and said spherical elastomeric thrust bearing may be rotationably fixed to the upper end of a rotor drive shaft.

Preferably, each elastomeric shear bearing comprises two elastomeric shear bearings located one at each side of the spherical elastomeric bearing.

With the rotor untilted, the rotor yoke and attached rotor blades may be located coincident with the plane of rotation of the driving member.

In another aspect the invention provides a rotor having a rotor head supporting a plurality of radially extending rotor blades for rotation about an axis, comprising a driving member rotationally fixed adjacent an outer end of a drive shaft located concentrically within a tubular rotor drive shaft with an inner end attached internally of the rotor drive shaft by flexible coupling means capable of transmitting torque and permitting relative axial movements, said driving member having three equi-spaced drive pins extending radially of the axis of rotation and in a plane of rotation perpendicular to the axis, each drive pin locating in an elastomeric bearing assembly having a spherical elastomeric bearing centred on the drive pin and two elastomeric shear bearings located one at each side of the spherical bearing in the plane of rotation and oriented parallel to the axis of rotation, a gimbal housing attached to the elastomeric shear bearings and supporting a rotor yoke for attachment of the rotor blades, a spherical elastomeric bearing attached to the gimbal housing with its geometral centre located at an intersection of the axis of rotation and the plane of rotation of the driving member whereby in operation the rotor can be tilted in any direction about the centre.

BRIED DESCRIPTION OF THE DRAWINGS

The invention will now be described by way of exampe only and with reference to the accompanying drawings in which, FIG. 1 is a fragmentary sectioned side view of a helicopter rotor constructed according to one embodiment of the invention, FIG. 2 is a fragmentary sectioned view taken on lines A—A of FIG. 1, FIG. 3 is a side view taken on arrow B of FIG. 2, FIG. 4 is a sectioned side view of a helicopter rotor constructed according to a further embodiment of the invention, FIG. 5 is a fragmentary sectioned view taken on lines C—C of FIG. 4, FIG. 6 is a sectioned side view of a helicopter rotor constructed according to a yet further embodiment of the invention, FIG. 7 is a sectioned view taken on lines D—D of FIG. 6, FIG. 8 is a part sectioned end view taken on arrow E of both of the embodiment of FIGS. 4 and 6 of hte invention, and FIGS. 9a-9c, 10a-10d, and 11a-11b, inclusive are generally schematic illustrations of operational features of the various embodiments.

DETAILED DESCRIPTION OF THE DRAWINGS

Figure 1:
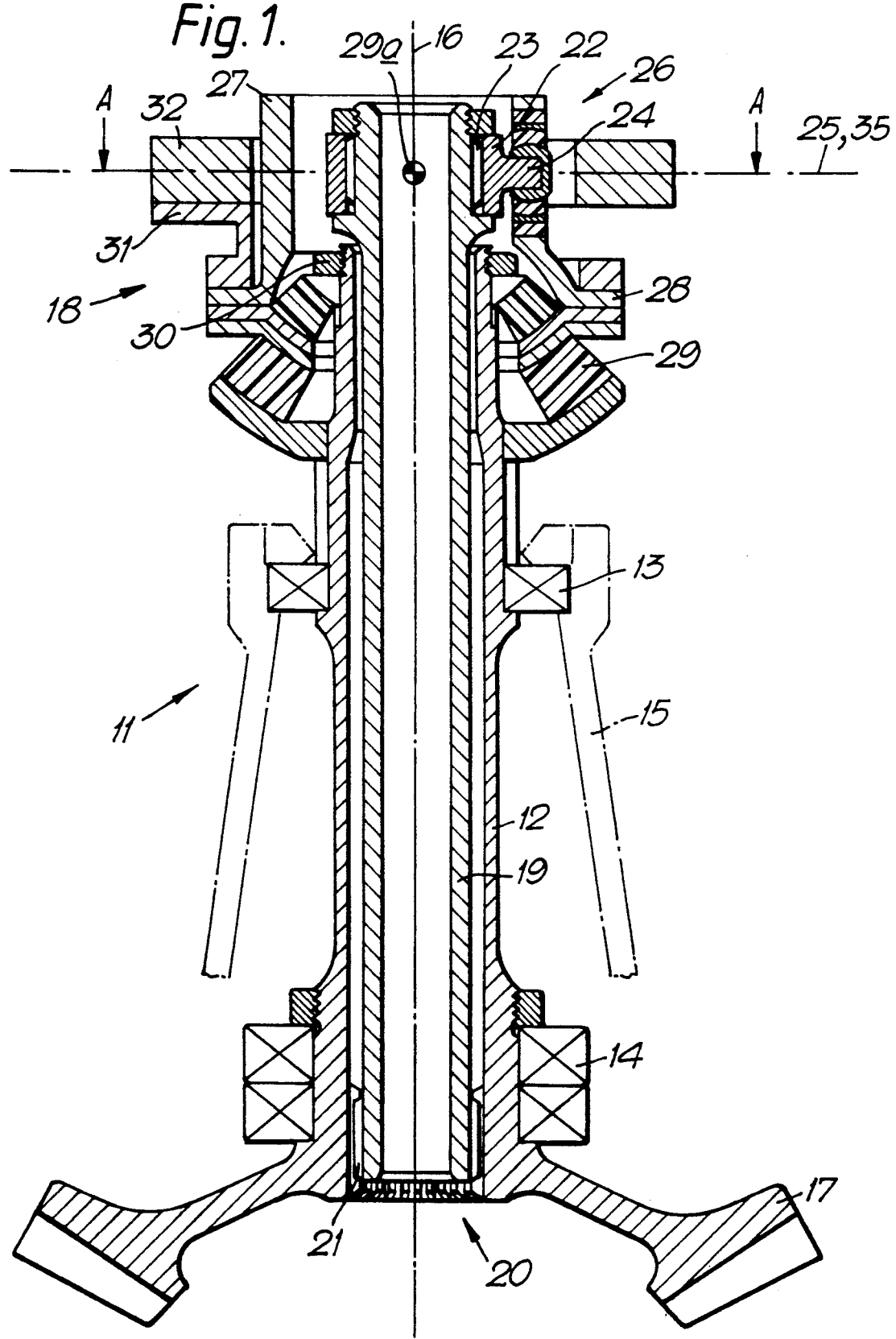
Figure 2:
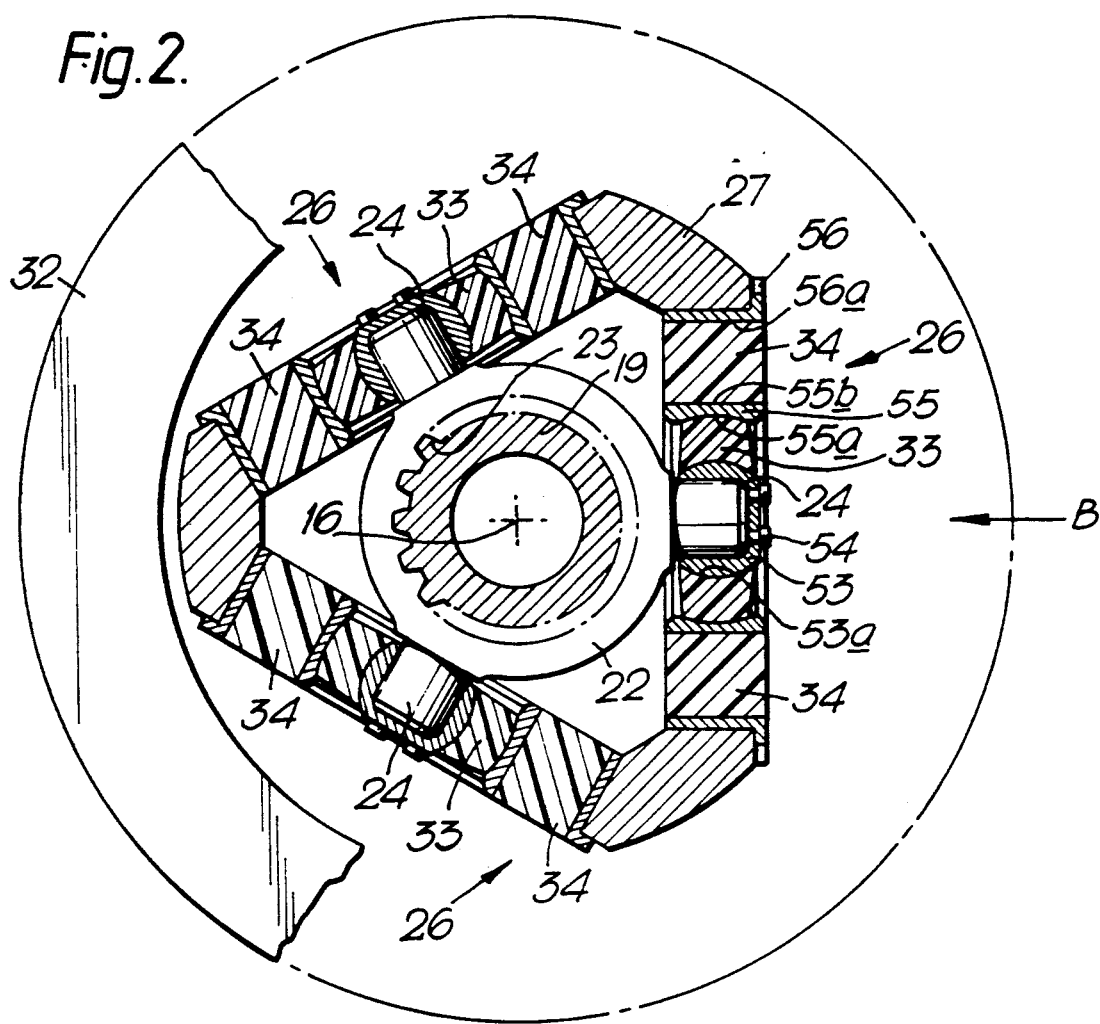
Figure 3:
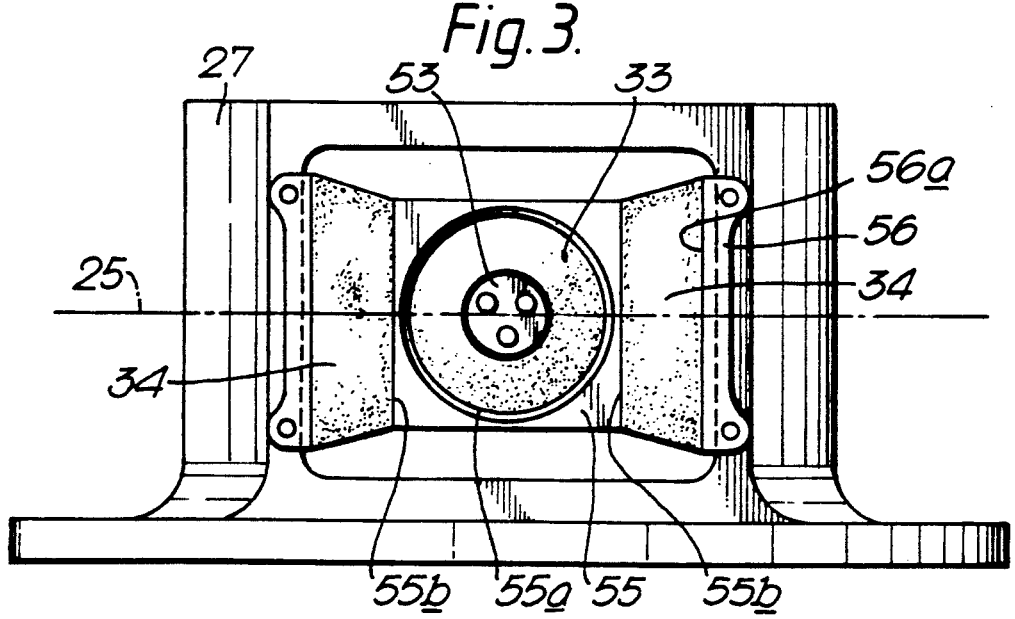

Referring now to FIGS. 1 to 3 inclusive, a rotor 11 for a helicopter anti-torque rotor comprises a tubular rotor drive shaft 12 mounted on spaced-apart bearings 13 and 14 in a gear case 15 for rotation about an axis 16. A lower end of the shaft 12 is rotationally fixed to an output gear 17 and an upper end protrudes from the gear case 15 to support a rotor head 18 at its upper end as will be described in detail hereinafter.

A lower end of an inner tubular drive shaft 19 is connected internally of the lower end of shaft 12 by flexible coupling means 20 comprising, in the illustrated embodiment, mated axial splines 21 permitting limited relative axial movements. The outer surface of drive shaft 19 is spaced-apart from the inner surface of shaft 12, and the inner shaft 19 protrudes from an upper end thereof to support a driving member 22 rotationally fixed to the inner shaft 19 by mated splines 23.

Driving member 22 includes three equi-spaced drive pins 24 extending radially of the axis of rotation 16 and located in a plane of rotation 25 that is perpendicular to the axis of rotation 16. Each drive pin 24 is connected to an elastomeric bearing assembly 26 attached to a gimbal housing 27 having a flanged lower end attached to a central flange 28 of a spherical elastomeric thrust bearing 29 which is rotationally fixed to the upper end of rotor drive shaft 12 and retained by a retaining nut 30.

The thrust bearing 29 has a geometral centre 29a located at the intersection between the rotational axis 16 and the plane of rotation 25 of the driving member 22.

Gimbal housing 27 also supports through an attachment ring 31 an annular yoke 32 which with the rotor untilted as shown in FIG. 1 is coincident with the plane of rotation 25, and is used to attach a plurality of radially extending rotor blades (not shown) as hereinafter described in more detail in respect of the other embodiments. It will be noted in this embodiment that a normal untilted plane of rotation 35 of the rotor yoke 32 and, therefore, its attached rotor blades is coincident with the plane of rotation 25 of the driving member 22.

Elastomeric bearings are well known and comprise layers of an elastomeric material bonded to and separated by a series of non-extensible members such as metal shims.

Each elastomeric bearing assembly 26 comprises a spherical elastomeric bearing 33 having an inner attachment sleeve 53 rotationally fixed to the drive pin 24 by bolts 54 (FIG. 2). An inner elastomeric layer of bearing 33 is bonded to an external spherical convex surface 53a of sleeve 53 and an outer elastomeric layer is bonded to an inner concave surface 55a of an outer annular attachment member 55. The spherical bearing 33 is located between a pair of flat elastomeric shear bearings 34 located one at each side of the spherical bearing in the plane of rotation 25 and oriented in a plane parallel to the axis of rotation 16. An inner elastomeric layer of each of bearings 34 is bonded to an external planar surface 55b of outer attachment member 55 and an outer elastomeric layer is bonded to a planar surface 56a of an attachment bracket 56 which is attached in turn to the gimbal housing 27.

Figure 4:
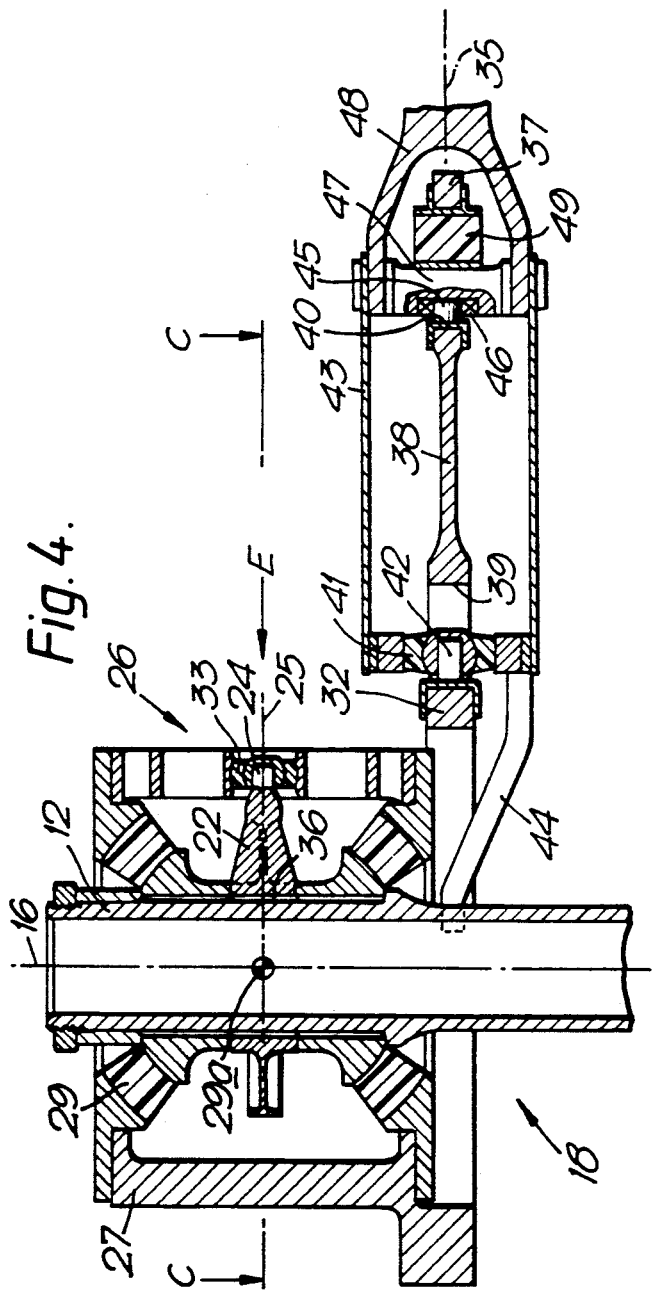
Figure 5:
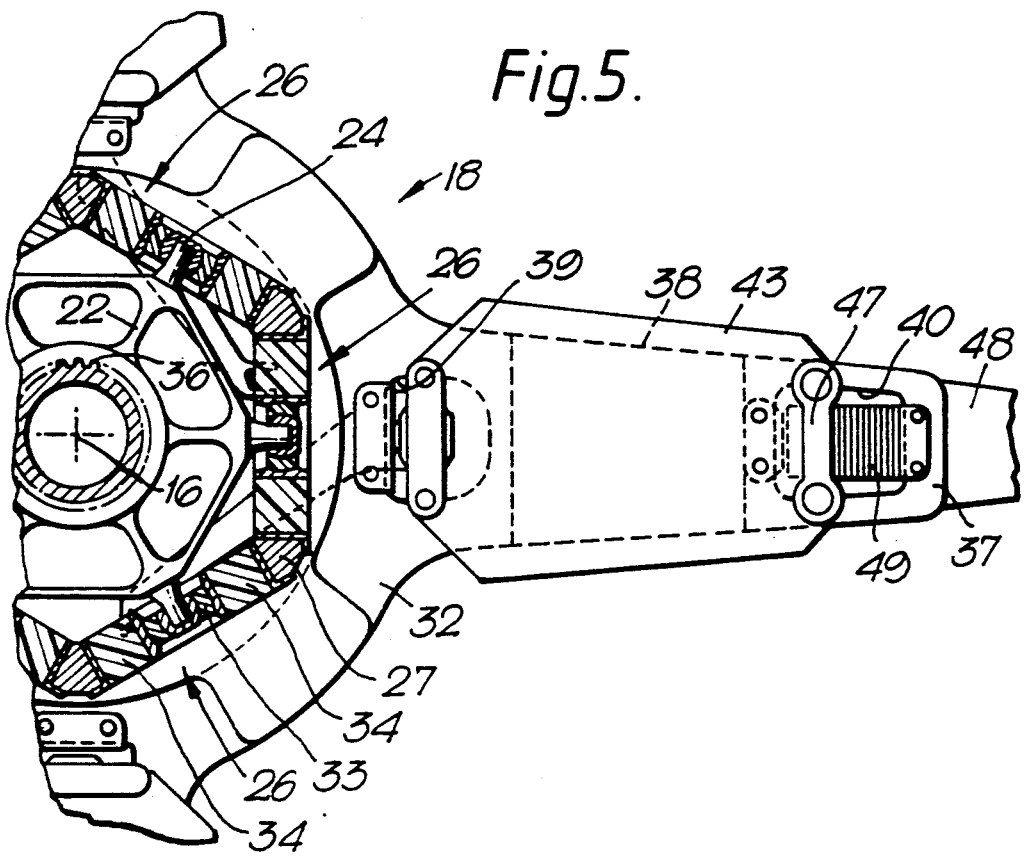

Referring now to the embodiment of FIGS. 4 and 5, like reference numerals have been used to indicate parts similar to those of the previous embodiment.

Thus, driving member 22 has six equi-spaced radially extending drive pins 24 (three only being shown) each located in an elastomeric bearing assembly 26 constructed similarly to that of the previous embodiment. The bearing assemblies 26 are attached to an annular gimbal housing 27 which supports a two part spherical elastomeric thrust bearing 29 having a geometral centre 29a located at the intersection of the axis of rotation 16 and plane of rotation 25 of the driving member 22 which is perpendicular thereto.

In this embodiment it is to be noted that the driving member 22 is rotationally fixed to the external surface of the rotor drive shaft 12 by mated splines 36. The thrust bearing 29 is also secured to the rotor drive shaft 12 as before.

The gimbal housing 27 again supports a rotor yoke 32 which in this embodiment is located at a lower end thereof so that is plane of rotation 35 is spaced-apart axially from the plane of rotation 25 of the driving member 22. Rotor yoke 32 includes four radially extending integral arms 37 each including an intermediate flexible portion 38 which is flexible in a plane perpendicular to the plane of rotation 35.

Inner and outer apertures 39 and 40 are located through each arm 37, the inner aperture 39 housing a spherical elastomeric bearing 41 centred on a spigot 42 attached to yoke 32 and supporting an inner end of a torque tube 43. A pitch change arm 44 is attached to the inner end of the torque tube 43 for connection during operation to blade pitch control means (not shown) in conventional manner.

A locating spigot 45 on an inner surface of outer aperture 40 is located in a journal bearing 46 supported in a pillar 47 which supports the outer end of torque tube 43 and also attaches the root end 48 of a rotor blade (not shown). A cylindrical elastomeric bearing 49 is located between the pillar 47 and an outer surface of outer aperture 40.

Figure 7:
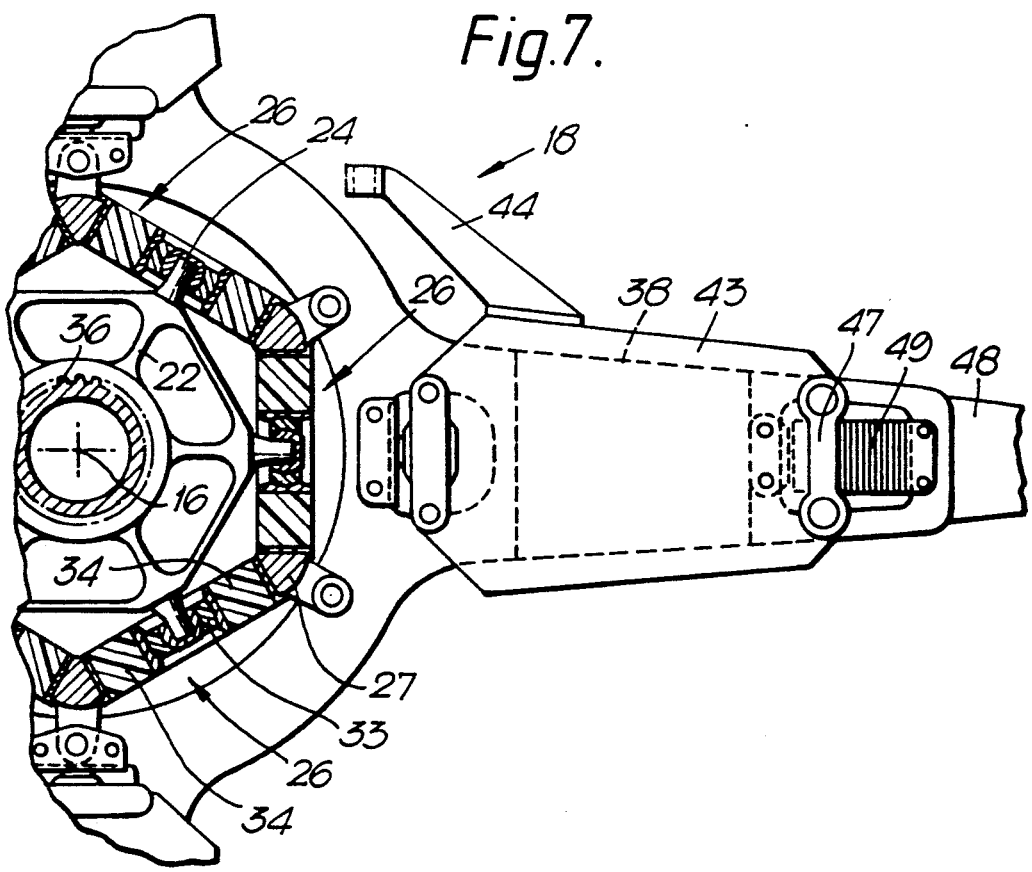
Figure 6:
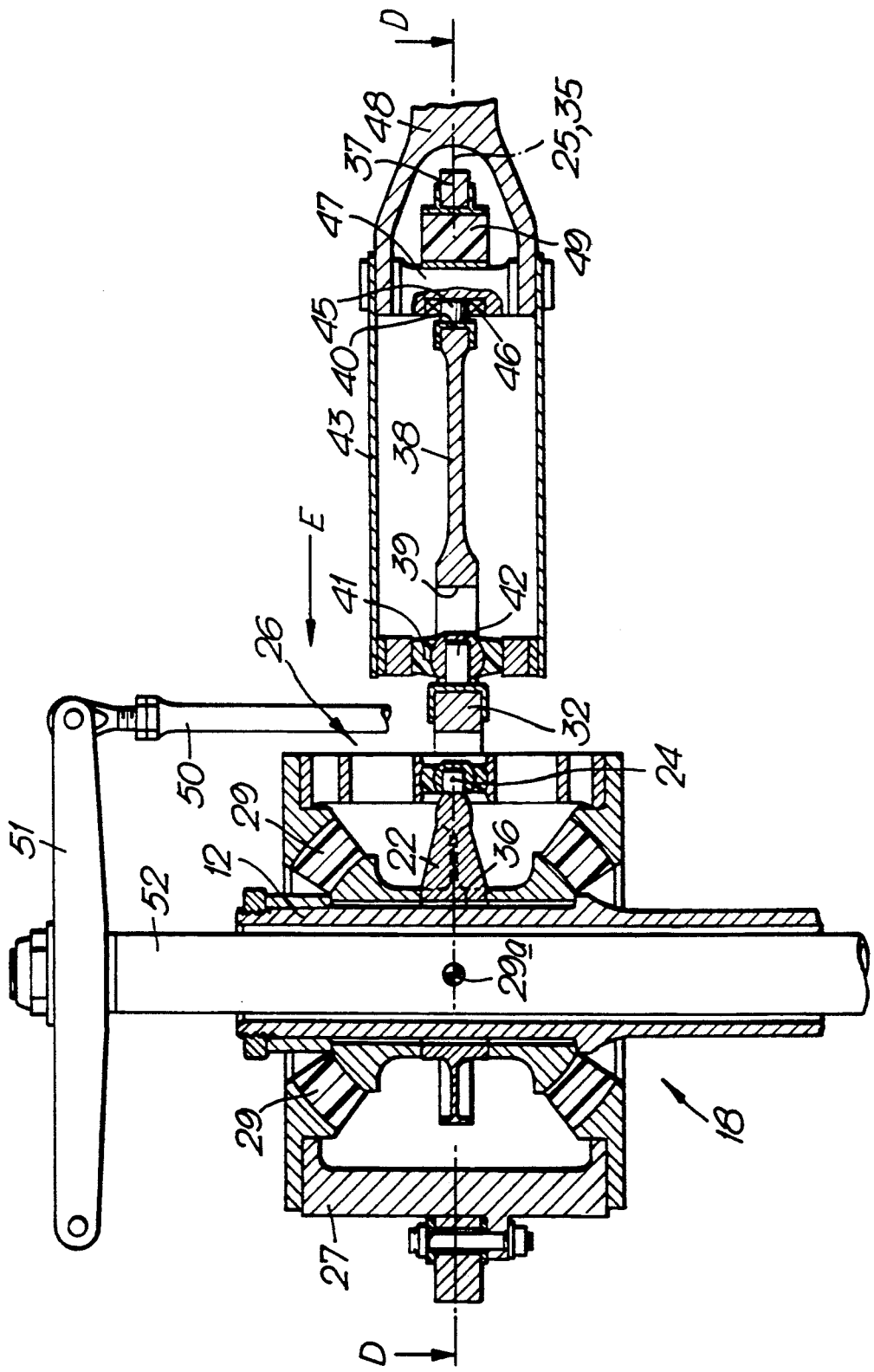

The embodiment of FIGS. 6 and 7 is similar to that of FIGS. 4 and 5 and again like reference numerals are used to indicate similar parts.

In this embodiment the rotor yoke 32 is supported at the centre of gimbal housing 27 so that the plane of rotation 35 of the untilted rotor is coincident with the plane of rotation 25 of the driving member 22 which again intersects the geometral centre 29a of bearing 29. Attachment of the four rotor blades via root ends 48 is identical to that previously described with reference to the embodiment of FIGS. 4 and 5.

This embodiment is configured particularly or use as an anti-torque rotor for a helicopter and to that end the pitch control arms 44 extend forwardly from an attachment to the torque tube 43 for connection to the ends of pitch control rods 50 carried by a control spider 51 secured to the end of a pitch control spindle 52 located concentrically through the rotor drive shaft 12.

Figure 8:
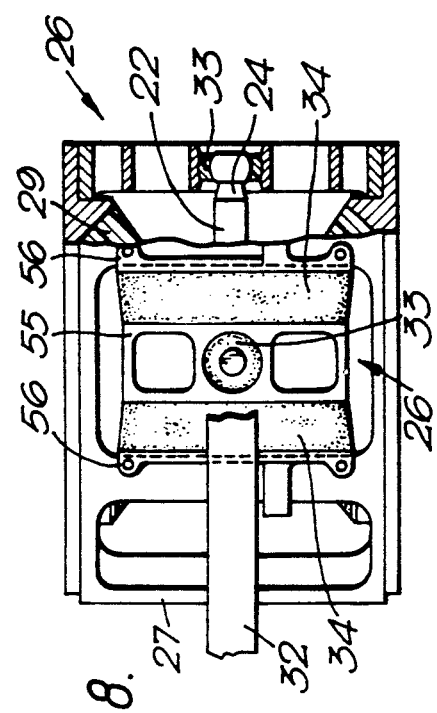

FIG. 8 is similar to FIG. 3 and gives more detail of the elastomeric bearing assemblies 26 used in the embodiments of FIGS. 4 to 7 inclusive. Thus each of the six drive pins 24 is located centrally of the spherical elastomeric bearing 33 which in turn is connected between the two elastomeric shear bearings 34 located in the plane of rotation 25 and oriented parallel to the axis of rotation 16. The elastomeric shear bearings 34 are attached to the gimbal housing 27 which is again connected to a spherical elastomeric thrust bearing 29 supported on the rotor drive shaft 12.

It will be apparent that the rotor blade attachment means of FIGS. 4 to 7 inclusive could also be used to attach a desired number of rotor blades to the rotor of the embodiment of FIG. 1.

In operation of the rotors of this invention, torque is transmitted from a transmission system through the inner drive shaft 19 of the embodiments of FIGS. 1 to 3 and through the rotor drive shaft 12 in the embodiments of FIGS. 4 to 8 inclusive to rotate the driving member 22 about the axis 16. Torque is transmitted through the spherical bearing 33 and shear bearings 34 of the elastomeric bearing assemblies 26 to the gimbal housing 27 and thence through the rotor yoke 32 to rotate the attached rotor blades.

Centrifugal forces are transmitted through the cylindrical elastomeric bearings 49 into the integral arms 37 of the rotor yoke 32.

Changes in the pitch of attached rotor blades are accomplished through pitch control means e.g. rods 50, spider 51 and spindle 52, and pitch change arms 44 to rotate the torque tubes 43 on the bearings 41 and 46, and accommodated through shear movement of the cylindrical elastomeric bearing 49.

Coning movement of the rotor blades, when all blades flap in unison, are accommodated in the flexible portions 38 of the arms 37, and thrust loads in either direction are transmitted through the yoke 32 and the spherical elastomeric thrust bearing 29 and the rotor drive shaft 12.

The present invention permits tilting of the plane of rotating 35 of the rotor yoke 32 and attached rotor blades in any direction about the geometral center 29a of the thrust bearing 29, stiffness being provided during tilting by the elastomeric bearing assemblies 26 and the elastomeric thrust bearing 29. Furthermore, during the misalignment that occurs in tilting the plane of rotation 35 the connection between driving member 22 and elastomeric bearing assemblies 26 provide a near constant velocity joint to minimise the adverse effects of Coriolis force.

In providing the required tilting of the rotors of this invention, a number of simultaneous motions occur in the various elastomeric bearings of the rotor head 18. Thus, tilting of the gimbal housing 27 relative to the drive shaft (12 or 19) is accommodated by the spherical elastomeric thrust bearing 29 which also maintains a desired focal point about which tilting occurs coincident with its geometral center 29a. Tilting of the gimbal housing 27 relative to the three or six pin driving member 22 is accommodated in the elastomeric bearing assemblies 26 whilst maintaining an efficient load path for torque transmission.

FIGS. 9 to 11 comprise generally schematic illustrations of the complex movements accommodated in the elastomeric bearing assemblies 26 and the elastomeric thrust bearing 29 during tilting of the gimbal housing 27 relative to the axis of rotation 16 of the rotor drive shaft 12.

Figure 9A:
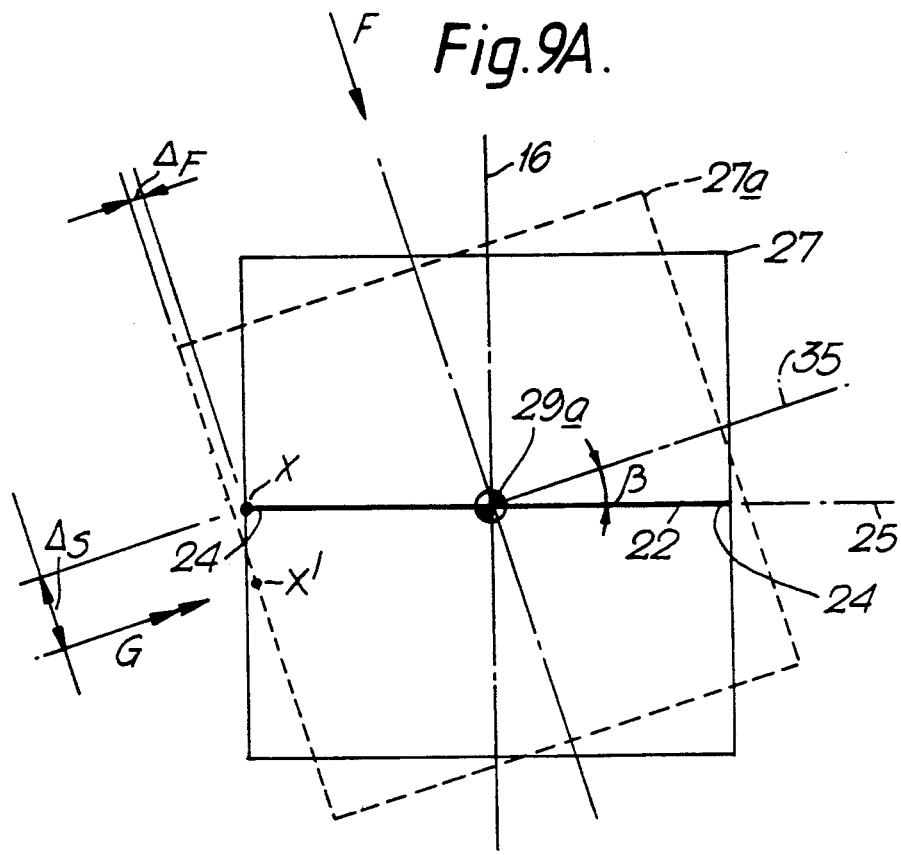
Figure 9B:
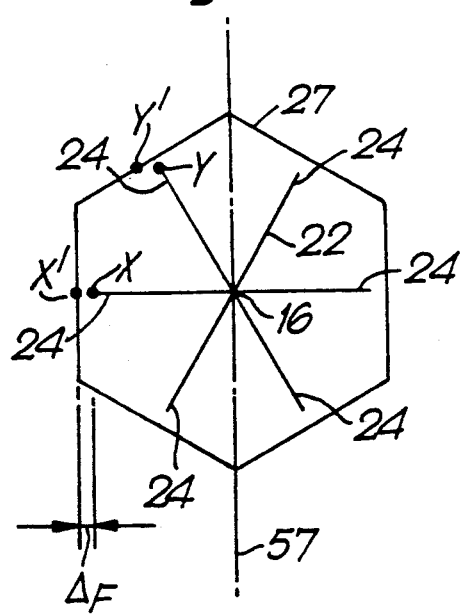
Figure 9C:
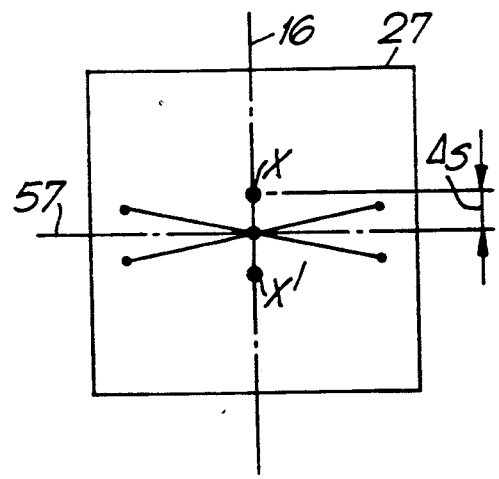

FIG. 9A is a schematic side view of a rotor according to this invention. Gimbal housing 27 is shown in an undeflected state in full line and tilted forward in broken line 27a through angle $\beta$ about a lateral axis 57 coincident with focal point 29a and perpendicular to axis 16. It will be clear that the driving member 22 foreshortens when viewed along arrow F (see also FIG. 9B) by an amount $\Delta_F$ and that there is a simultaneous out of plane movement between points X and $X^1$ of magnitude $\Delta_S$ when viewed along arrow G (see also FIG. 9C). In operation, $\Delta_S$ is accommodated by shearing of the elastomeric shear bearings 34 in a direction parallel to the axis of rotation 16 whilst the foreshortening $\Delta_F$ is accommodated by shearing of the elastomeric shear bearings 34 of the elastomeric bearing assemblies 26 in a direction perpendicular to the axis of rotation.

Figure 10A:
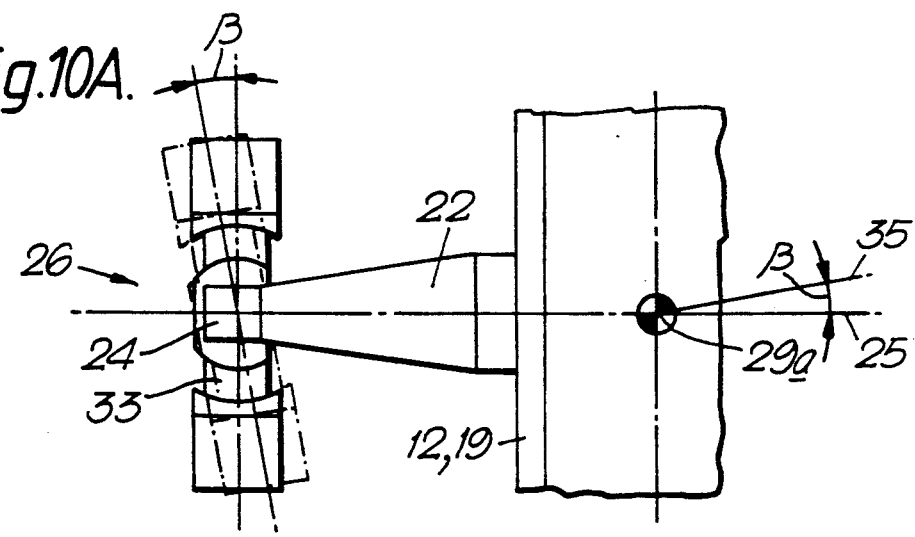

The desired relative cocking motion between the gimbal housing 27 and the driving member 22 equal to the tilting angle $\beta$ is accommodated by shear motion in the spherical elastomeric bearings 33 of the elastomeric bearing assemblies 26 as shown in broken outline in FIG. 10A.

Figure 10B:
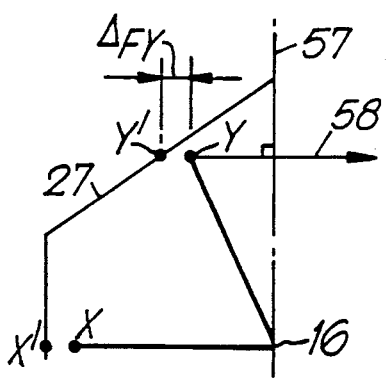
Figure 10C:
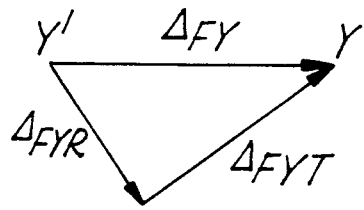

Reverting again to FIG. 9B and referring also FIG. 10B it is also necessary to consider the more complex motion of point Y which is neither on the lateral axis 57 nor on an axis perpendicular to the lateral axis (as point X). It will be noted that point Y is subject to a foreshortening between Y'Y ($\Delta_{FY}$) relative the gimbal housing 27 and which is perpendicular to the lateral axis 57 and not purely radial as indicated by arrow 58 in FIG. 10B. Thus, the foreshortening motion Y'Y has a radial component $\Delta_{FYR}$ and a tangential component $\Delta_{FYT}$ as indicated in FIG. 10C.

Figure 10D:
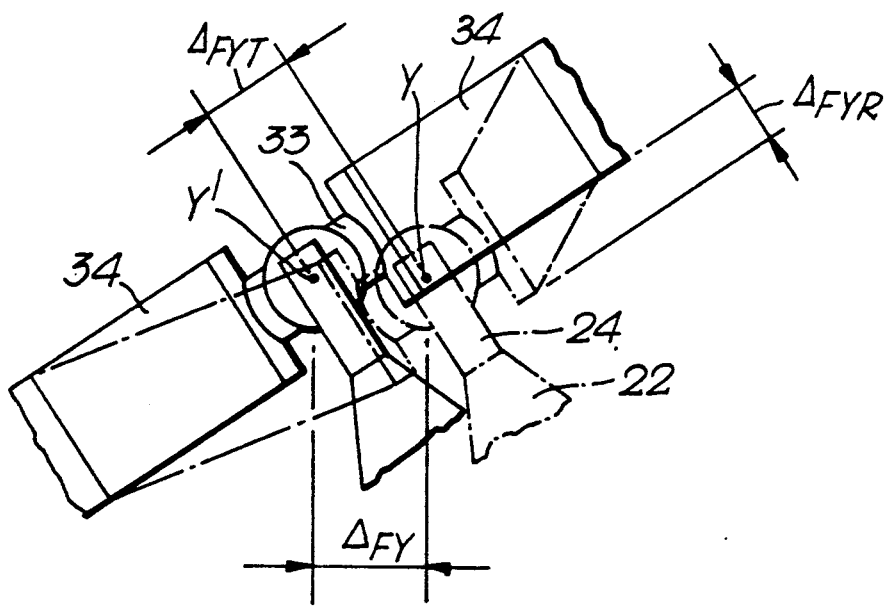

The radial component $\Delta_{FYR}$ is accommodated by shear motion of the elastomeric shear bearings 34 in the same manner as the radial motion X'X; however the tangential component $\Delta_{FYT}$ must be accommodated by compression of the elastomeric shear bearings 34 and the spherical elastomeric bearing 33 of the elastomeric bearing assemblies 26 as indicated between the full line and broken line positions in FIG. 10D.

Figure 11A:
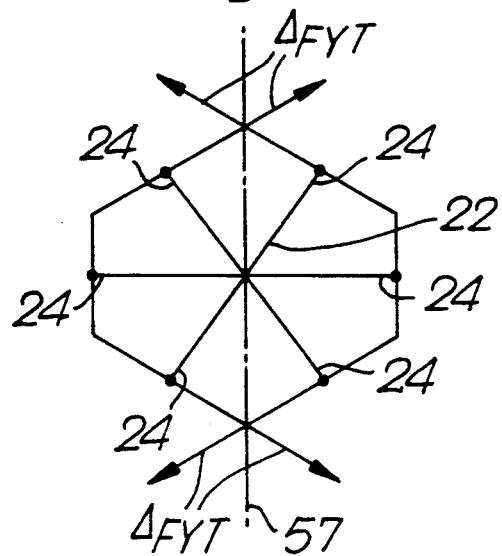

Since the elastomeric bearing assemblies 26 are relatively stiff in the tangential direction, in rotors with a driving member having six pins substantial resistance to the tilting motion is encountered which increases rapidly with an increase in the tilt angle $\beta$. Thus, the rotors exhibit increasing stiffness with tilt angle. These tangential components $\Delta_{FYT}$ of the foreshortening motions $\Delta_{FY}$ result in substantial internal loads in the rotor; however, as shown in FIG. 11A, in the six pin embodiments the tangential load components $\Delta_{FYT}$ are self cancelling and therefore provide for self-centering of of the rotor.

Figure 11B:
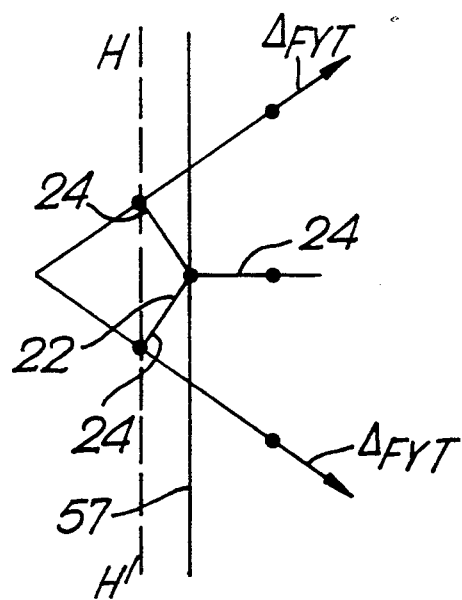

However, in considering the three pin arrangement of the embodiment of FIGS. 1 to 3 in the same azimuthal position relative the tilting axis 57, and with reference to FIG. 11B it will be seen that the tangential components $\Delta_{FYT}$ are not self cancelling and an in-plane motion of the drive member 22 must occur in order to eliminate the foreshortening motion $\Delta_{FY}$ and the tangential components $\Delta_{FYT}$ thereof. In effect the unit tilts about axis H-$H^1$ rather than about the central lateral axis 57 through the center 29b and consideration of this lateral motion with varying azimuth showed it to be a three-per-rev "stirring" motion in which the center of the driving member 22 described a circle whose radius is proportional to the square of the tilt angle $\Delta$.

This motion would normally result in unacceptable in-plane vibratory forcing; however, the rotor of FIGS. 1 to 3 effectively alleviates the potentially detrimental effects by permitting the necessary relative motion between the driving member 22 and the gimbal housing 27 to occur by "stirring" motion of the upper end of the inner drive shaft 19 to which the driving member 22 is attached. Since the shaft 19 has a negligible mass compared to the rotor, the three-per-rev in-plane vibratory forcing is also negligible and therefore acceptable.

Consequently centering of the rotor is easily achieved by the spherical thrust bearing 29.

The necessary small cocking motions of the inner drive shaft 19 are accommodated in the embodiment of FIGS. 1 to 3 by resilient flexing of the shaft itself, whilst the necessary axial motions are accommodated in the mated splines 21.

It will be understood that primary displacements associated with tilting of the rotor of the embodiment of FIGS. 1 to 3 are accommodated in the same manner as hereinbefore described with reference to the embodiments of FIGS. 4 to 8 inclusive.

The arrangements herein described and illustrated for connecting a drive shaft to a rotor head incorporating what may be termed a gimbal unit provides a near constant velocity joint which substantially eliminates Coriolis loading within the rotor making it particularly attractive for both the main sustaining and anti-torque rotors of a helicopter and as the sustaining/propelling rotor in either tilt wing or tilt rotor VTOL aircraft.

The wide use of elastomeric bearings leads to low maintenance requirements and benign failure characteristics. The arrangements possess tuneable and non-linear flapping stiffness characteristics which, in a main sustaining rotor will permit optimisation of aircraft handling characteristics and in an anti-torque rotor may eliminate the normal requirement for external gust locks. The use of separate elastomeric spherical and shear bearings in the elastomeric bearing assemblies 26 facilitates accurate tailoring of the operational requirements in all planes of operation and minimises the required size and weight of the assemblies.

In rotors having an odd number of drive pins 24, the three drive pin arrangement of FIGS. 1 to 3 inclusive is preferred because it provides a rotor having a low parts count making it simple and lightweight. In rotors having an even number of drive pins 24 the six drive pin arrangement of FIGS. 4 to 7 inclusive is preferred because it minimises rotor moment and torque fluctuations that arise due to alternate "locking" and "unlocking" of the elastomeric shear bearings 34 when operating respectively in compression and shear during rotation of the rotor.

Whilst several embodiments have been described and illustrated it will be apparent that many modifications may be made without departing from the scope of the invention as defined in the appended claims. For example, in the embodiment of FIGS. 1 to 3 inclusive, the flexible coupling means 20 could also be arranged to provide for the necessary "stirring" motion of the upper end of the inner tubular drive shaft 19 by comprising "barrelled" splines or any other suitable form of flexible coupling. Whilst requiring a minimum of three drive pins 24, rotors according to this invention can have any number of drive pins 24 other than the alternative six drive pin arrangements herein described and illustrated. In rotors having an odd number of drive pins 24 it will be advantageous to incorporate means such as the inner tubular drive shaft 19 of the embodiment of FIGS. 1 to 3 inclusive to eliminate the undesirable "stirring" motion, however, this will not be necessary for rotors having an even number of drive pins 24 due to automatic cancellation of the forces causing the "stirring" motion as described with reference to the six drive pin arrangement of FIGS. 4 to 7 inclusive.

What is claimed is:

1. A rotor having a rotor head supporting a plurality of radially extending rotor blades for rotation about an axis and comprising a driving member rotationally fixed adjacent one end of a drive shaft, and having at least three equi-spaced drive pins extending radially of the axis of rotation and in a plane of rotation perpendicular to said axis, each drive pin locating in an elastomeric bearing assembly having a spherical elastomeric bearing centered on the drive pin and an elastomeric shear bearing located in the plane of rotation and oriented parallel to the axis of rotation, a gimbal housing attached to the elastomeric shear bearings and supporting a rotor yoke for attachment of the rotor blades, a spherical elastomeric thrust bearing attached to the gimbal housing with its geometral center located at an intersection of the axis of rotation and the plane of rotation of the driving member, whereby in operation the rotor can be tilted in any direction about said center.

2. A rotor as claimed in claim 1, wherein said driving member has an odd number of drive pins.

3. A rotor as claimed in claim 2, wherein said driving member has three drive pins.

4. A rotor as claimed in claim 2, wherein said drive shaft is located concentrically within a tubular rotor drive shaft and an inner end of the drive shaft is attached internally of the rotor dirve shaft by flexible coupling means capable of transmitting torque whilst permitting relative axial movements.

5. A rotor as claimed in claim 4, wherein said flexible coupling means comprise mated axial splines.

6. A rotor as claimed in claim 4, wherein said spherical elastomeric bearing is attached to the end of the rotor drive shaft.

7. A rotor as claimed in claim 1, further characterised in that said driving member has an even number of drive pins.

8. A rotor as claimed in claim 7, wherein said driving member has six drive pins.

9. A rotor as claimed in claim 7, wherein said driving member and said spherical elastomeric thrust bearing are rotationally fixed to the rotor drive shaft.

10. A rotor as claimed in claim 1, wherein each elastomeric shear bearing comprise two elastomeric shear bearings located one at each side of the spherical elastomeric bearing.

11. A rotor as claimed in claim 1, wherein with the rotor untilted the rotor yoke is located coincident with the plane of rotation of the driving member.

12. A rotor having a rotor head supporting a plurality of radially extending rotor blades for rotation about an axis and comprising a driving member rotationally fixed adjacent an outer end of a drive shaft located concentrically with a tubular rotor drive shaft with an inner end attached internally of the rotor drive shaft by flexible coupling means capable of transmitting torque and permitting relative axial movements, said driving member having three equi-spaced drive pins extending radially of the axis of rotation and in a plane of rotation perpendicular to the axis, each drive pin locating in an elastomeric bearing assembly having a spherical elastomeric bearing centered on the drive pin and two elastomeric shear bearings located one at each side of the spherical bearing in the plane of rotation and oriented parallel to the axis of rotation, a gimbal housing attached to the elastomeric shear bearings and supporting a rotor yoke for attachment of the rotor blades, a spherical elastomeric thrust bearing attached to the gimbal housing with its geometral center located at an intersection of the axis of rotation and the plane of rotation of the driving member whereby in operation the rotor can be tilted in any direction about the center.

* * * * *